(12) United States Patent
Hinds et al.

(10) Patent No.: US 12,707,094 B2
(45) Date of Patent: Aug. 11, 2026

(54) IMAGE METADATA FOR VIDEO STREAMS

(71) Applicant: TENCENT AMERICA LLC, Palo Alto, CA (US)

(72) Inventors: Arianne Hinds, Los Gatos, CA (US); Stephan Wenger, Los Gatos, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/903,636

(22) Filed: Oct. 1, 2024

(65) Prior Publication Data

US 2025/0119588 A1 Apr. 10, 2025

Related U.S. Application Data

(60) Provisional application No. 63/544,833, filed on Oct. 19, 2023, provisional application No. 63/544,154, filed on Oct. 14, 2023, provisional application No. 63/542,751, filed on Oct. 5, 2023.

(51) Int. Cl.
*H04N 19/70* (2014.01)
*H04N 19/46* (2014.01)

(52) U.S. Cl.
CPC ............. *H04N 19/70* (2014.11); *H04N 19/46* (2014.11)

(58) Field of Classification Search
CPC ............................... H04N 19/70; H04N 19/46
See application file for complete search history.

(56) References Cited

U.S. PATENT DOCUMENTS

| | | | | |
|---|---|---|---|---|
| 2017/0105042 | A1 | 4/2017 | Toma et al. | |
| 2018/0035095 | A1 | 2/2018 | Newton et al. | |
| 2018/0352219 | A1 | 12/2018 | Maze et al. | |
| 2021/0295567 | A1 * | 9/2021 | Lee | G06T 9/001 |
| 2022/0159264 | A1 * | 5/2022 | Toma | H04N 19/44 |
| 2022/0337857 | A1 | 10/2022 | Choi et al. | |

(Continued)

FOREIGN PATENT DOCUMENTS

CN 116883223 A * 10/2023 ........... G06T 1/0021

OTHER PUBLICATIONS

Ugur et al. ("Exif data SEI message", Joint Collaborative Team on Video Coding (JCT-VC) of ITU-T SG 16 WP 3 and ISO/IEC JTC 1/SC 29/WG 11; 10th Meeting: Stockholm, SE, Jul. 11-20, 2012; Document: JCTVC-J0038). (Year: 2012).*

(Continued)

*Primary Examiner* — Maria E Vazquez Colon
(74) *Attorney, Agent, or Firm* — Sughrue Mion, PLLC

(57) ABSTRACT

A method and apparatus comprising computer code for video processing, the method including setting an image format metadata type identifier, wherein the image format metadata type identifier indicates a type of metadata included in a supplemental enhancement information (SEI) message associated with a current image; signaling the image format metadata type identifier in a bitstream; and encoding the current image in the bitstream based on the image format metadata type identifier. The method may also include signaling an image format metadata universal resource identifier flag, wherein the image format metadata universal resource identifier flag indicates whether image information payload associated with the current image is obtained from a payload of the SEI message.

18 Claims, 17 Drawing Sheets

(56) References Cited

U.S. PATENT DOCUMENTS

| | | | | |
|---|---|---|---|---|
| 2023/0171434 | A1* | 6/2023 | Chen | H04N 19/46 375/240.09 |
| 2023/0209074 | A1* | 6/2023 | Takada | H04N 19/184 375/240.26 |

OTHER PUBLICATIONS

International Search Report issued Feb. 6, 2025 in Application No. PCT/US2024/049929.

Written Opinion of the International Searching Authority issued Feb. 6, 2025 in Application No. PCT/US2024/049929.

* cited by examiner

Decoder
300
Channel
301
Receiver
302
Buffer Memory
303
Parser
304
Symbols
313
Scaler / Inverse Transform
305
Motion Comp. Prediction
306
Intra Prediction
307
Reference Picture Buffer
308
Current Picture
309
+
310
Loop Filter
311
Display
312

FIG. 4

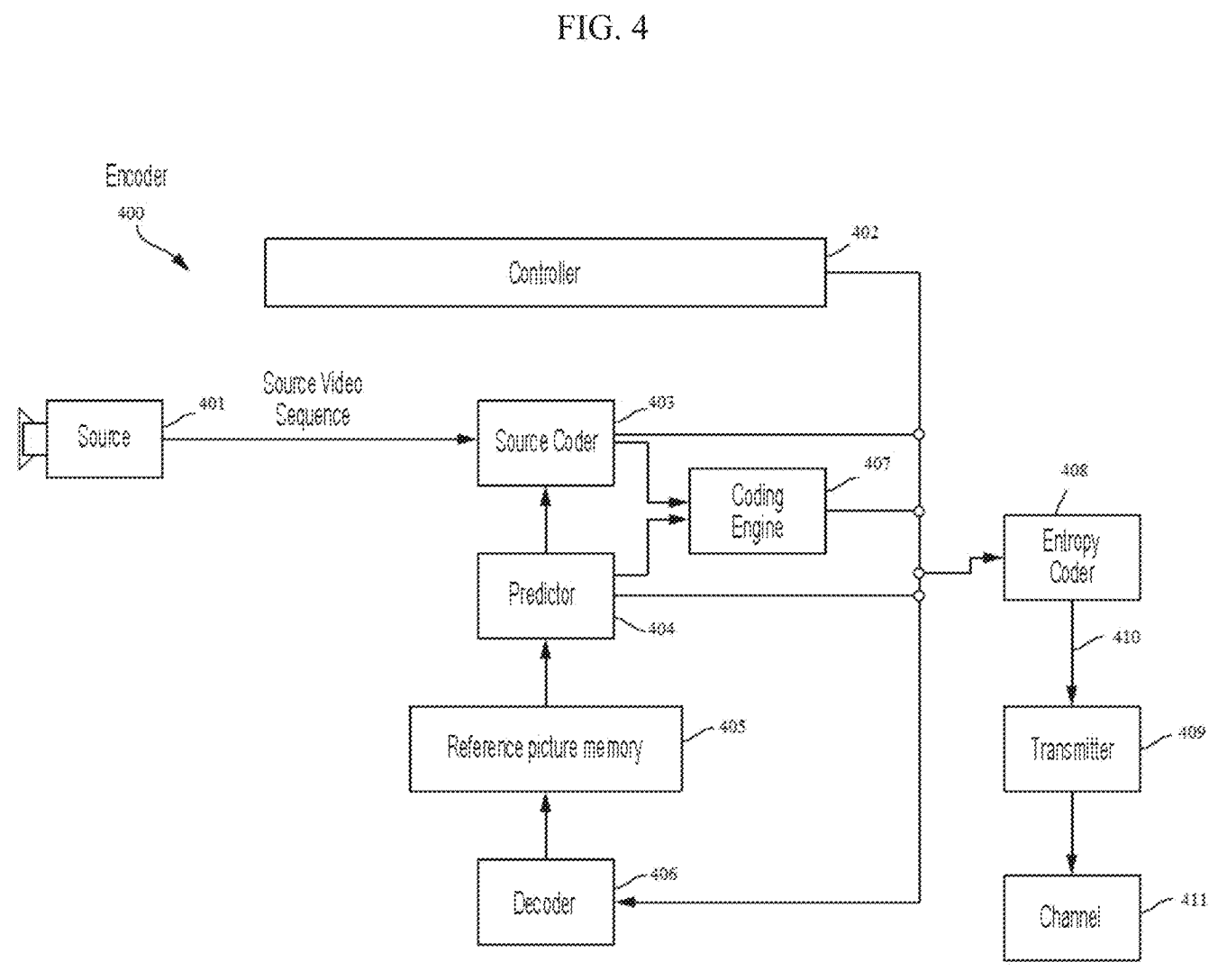

Encoder 400
Source 401
Source Video Sequence
Controller 402
Source Coder 403
Predictor 404
Reference picture memory 405
Decoder 406
Coding Engine 407
Entropy Coder 408
410
Transmitter 409
Channel 411 nal_unit_header 502
NAL Unit 501
502
503
504
505
506
507
nal_unit_header() {
Description
forbidden_zero_bit
f()
nuh_reserved_zero_bit
u()
nuh_layer_id
u()
nuh_unit_type
u()
nuh_temporal_id_plus1
u()
}
510
DCI 512
VPS 513
SPS 514
Prefix-APS 516
PH 517
Prefix-SEI 518
VCL NAL 519
Suffix-SEI 518
Decoding Order 510
530
530
nal_unit_header 521
payload_type_byte 522
payload_size_byte 522
Payload 524
payload_type_byte 522
payload_size_byte 522
Payload 524
520

Source 201
Source Video Sequence
Encoder 203
Supp. AI Metadata 701
Supp. Metadata 705
Coded Video Stream 604
Coded Picture Data 602
Supp. Metadata SEI messages 603
Coded Picture Data 602
604
Decoder 210
Decoded Video Stream 607
Reconstructed Picture Data 605
Supp. Metadata SEI Payload 806
Reconstructed Picture Data 605
607
Generative AI Process 703
Output
Generative AI Process Output 704

801
802
'0xFFD8'
803
JPEG Image 806
'0xFFE0'
804
'0xFFE1'
805
Apple iPhone 12 Pro
16.6.1

SEI NAL Unit 901
EXIF payload in SEI 902
903
0xFFE1 804
FFE13E1B 45786966 00004D4D 002A0000 0008000C 010F0002 00000006 0000009E 01100002
0000000E 000000A4 01120003 00000001 00060000 011A0005 00000001 000000B2 011B0005
00000001 000000BA 01280003 00000001 00020000 01310002 00000007 000000C2 01320002
00000014 000000CA 013C0002 0000000E 000000DE 02130003 00000001 00010000 87690004
00000001 000000EC 88250004 00000001 00000890 000009A2 4170706C 65006950 686F6E65
20313220 50726F00 00000048 00000001 00000048 00000001 31362E36 2E310000 32303233

0x4A46494600 == JFIF
1002
1001
FFE00014
4A464946
00010101
012C012C
0000414D5046
1003
0x4A46585800 ==
JFXX
FFE03419
4A465858
0010FFD8 ...
1004
FFE13E1B 45786966 00004D4D 002A0000 0008000C 010F0002 00000006 0000009E 01100002
0000000E 000000A4 01120003 00000001 00060000 011A0005 00000001 000000B2 011B0005
00000001 000000BA 01280003 00000001 00020000 01310002 00000007 000000C2 01320002
00000014 000000CA 013C0002 0000000E 000000DE 02130003 00000001 00010000 87690004
00000001 000000EC 88250004 00000001 00000890 000009A2 4170706C 65006950 686F6E65
20313220 50726F00 00000048 00000001 00000048 00000001 31362E36 2E310000 32303233
1005

| exif_metadata (payloadSize) { | Description |
|---|---|
| exif_cancel_flag | u(1) |
| if (!exif_cancel_flag) { | |
| exif_persistence_flag | u(1) |
| exif_mode_id | u(8) |
| if (exif_mode_id == 0){ | |
| for(i=1;i<payloadSize; i++) | |
| exif_data_payload_byte | b(8) |
| } | |
| else if (exif_mode_id ==1){ | |
| exif_data_URI | st(v) |
| } | |
| } | |
| } | |

FIG. 14

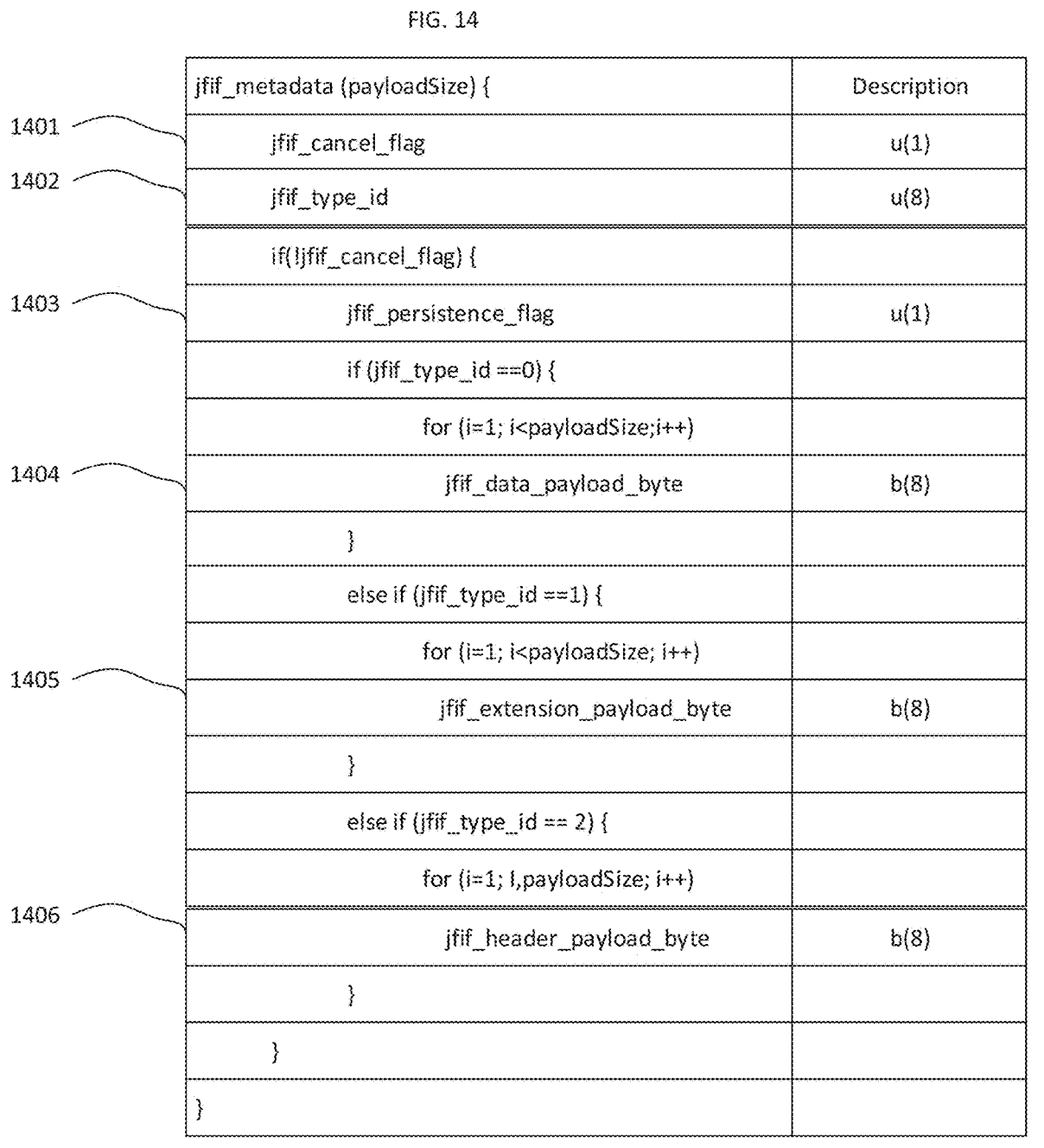

| jfif_metadata (payloadSize) { | Description |
| --- | --- |
| jfif_cancel_flag | u(1) |
| jfif_type_id | u(8) |
| if(!jfif_cancel_flag) { | |
| jfif_persistence_flag | u(1) |
| if (jfif_type_id ==0) { | |
| for (i=1; i<payloadSize;i++) | |
| jfif_data_payload_byte | b(8) |
| } | |
| else if (jfif_type_id ==1) { | |
| for (i=1; i<payloadSize; i++) | |
| jfif_extension_payload_byte | b(8) |
| } | |
| else if (jfif_type_id == 2) { | |
| for (i=1; I,payloadSize; i++) | |
| jfif_header_payload_byte | b(8) |
| } | |
| } | |
| } | |

FIG. 15

| xmp_metadata (payloadSize) { | Description |
| --- | --- |
| xmp_cancel_flag | u(1) |
| if (!xmp_cancel_flag) { | |
| exif_persistence_flag | u(1) |
| for(i=1;i<payloadSize; i++) | |
| exif_data_payload_byte | b(8) |
| } | |
| } | |

| | image_metadata (payloadSize) { | Description |
|---|---|---|
| 1601 | im_cancel_flag | u(1) |
| 1602 | im_type | u(8) |
| | if(!im_cancel_flag) { | |
| 1603 | im_persistence_flag | u(1) |
| | if (im_type == 0) { | |
| 1303 | exif_mode_id | u(8) |
| | if (exif_mode_id == 0){ | |
| | for(i=1;i<payloadSize; i++) | |
| 1304 | exif_data_payload_byte} | b(8) |
| | else if (exif_mode_id ==1){ | |
| 1305 | exif_data_URI }} | st(v) |
| | else if (im_type ==1) { | u(8) |
| 1402 | jfif_type_id | |
| | if (jfif_type_id ==0) { | |
| | for (i=1; i<payloadSize;i++) | |
| 1404 | jfif_data_payload_byte} | b(8) |
| | else if (jfif_type_id ==1) { | |
| | for (i=1; i<payloadSize; i++) | |
| 1405 | jfif_extension_payload_byte} | b(8) |
| | else if (jfif_type_id == 2) { | |
| | for (i=1; I,payloadSize; i++) | |
| 1406 | jfif_header_payload_byte}} | b(8) |
| | else if (im_type ==2) { | |
| | for (i=1; I,payloadSize; i++) | |
| 1503 | xmp_data_payload_byte}}} | b(8) |

Figure 17:
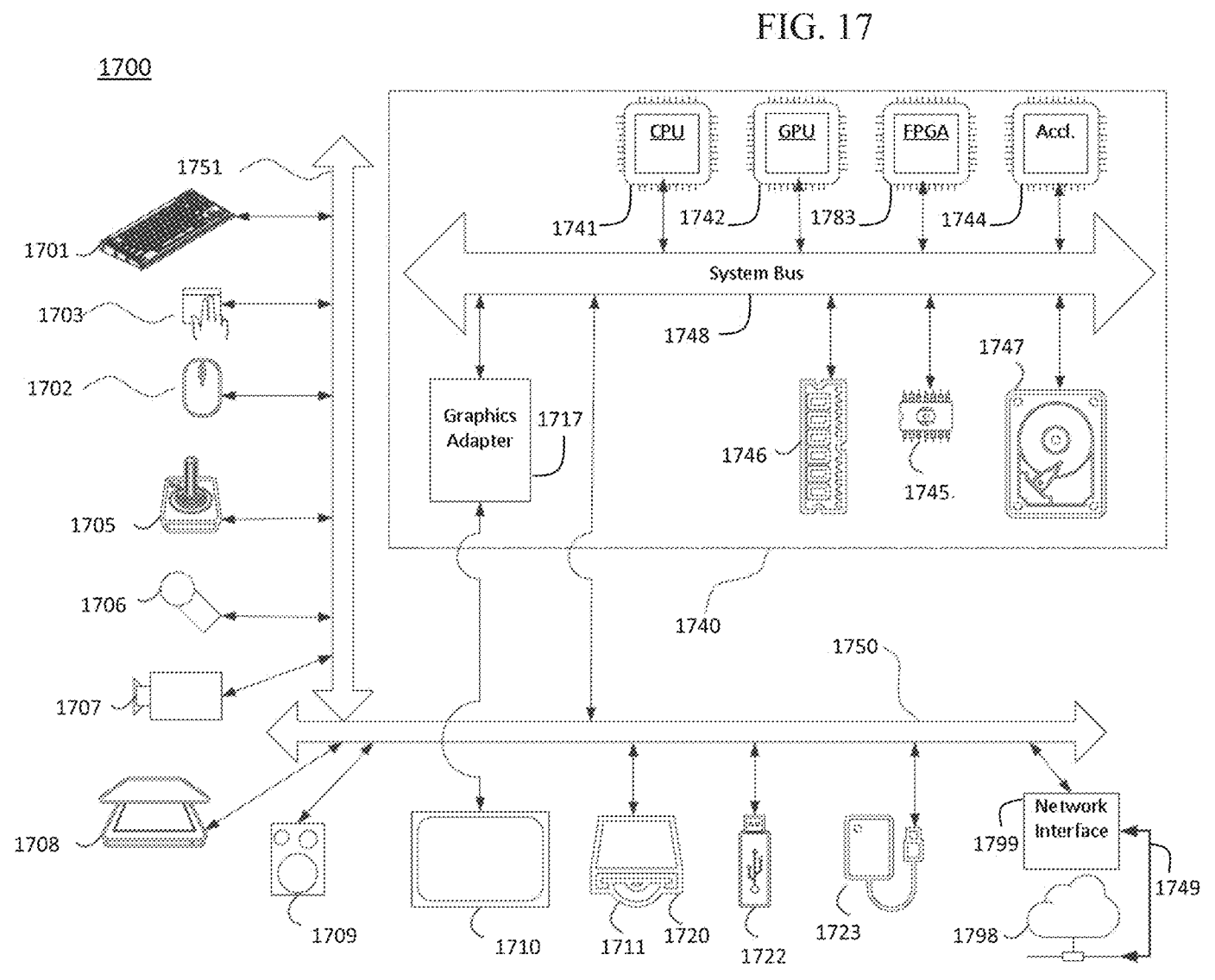

CPU
GPU
FPGA
Accl.
System Bus
Graphics Adapter
Network Interface 1701 1702 1703 1705 1706 1707 1708 1709 1710 1711 1717 1720 1722 1723 1740 1741 1742 1744 1745 1746 1747 1748 1749 1750 1751 1783 1798 1799

IMAGE METADATA FOR VIDEO STREAMS

CROSS REFERENCE TO RELATED APPLICATION

The present application claims priority to U.S. Provisional Application No. 63/542,751, filed on Oct. 5, 2023, U.S. Provisional Application No. 63/544,154, filed on Oct. 14, 2024, and U.S. Provisional Application No. 63/544,833, filed on Oct. 19, 2024, the disclosure of which are incorporated herein in their entireties.

FIELD

Embodiments of this disclosure are directed to video coding and decoding. Specifically, embodiments of the present disclosure are related to the carriage and or reference of popular image metadata formats within the coded video stream for video-based applications.

BACKGROUND

Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 GB/s bandwidth. An hour of such video requires more than 600 GB of storage space.

Accordingly, video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed.

Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Another technique used in video coding standards is the Supplemental Enhancement Information (SEI) message which enables the carriage of information, within the coded bitstream, that is supplemental to the coded video. Such SEI information may or may not be directly related to the video coding process. In most cases, the information in SEI messages is relevant to application processes that are executed in tandem with, or closely following, the video decoding process. For example, such applications can include a rendering process that uses certain SEI messages to adjust the brightness or color space of the decoded video frames prior to presentation by a display device.

Within the current standards that utilize SEI messages, e.g., H.264, AVC, H.265, HEVC, an H.266, and VVC can be separated into two broad classes: those that can impact the video decoding process, and those that cannot impact the video decoding process, i.e., for external applications. SEI messages that cannot impact the decoding process are specified in a separate specification entitled “Versatile supplemental enhancement information messages for coded video bitstreams” (VSEI), whereas SEI messages that can affect the decoding process are specified in the main coding specification “Versatile Video Coding.”

In related art, SEI messages enable the carriage (or reference via Uniform Resource Identifiers) of neural networks that are to be applied to one or more of the decoded pictures from within the video stream. However, not all AI-based applications may choose to leverage these newly specified SEI messages as these messages are specified to either reference or carry a neural network model. Rather, there are some AI applications where the neural network does not need to be carried (or referenced from) the coded video stream, e.g., emerging applications for generative Artificial Intelligence.

SUMMARY

According to an embodiment, a method and apparatus comprising computer code for video processing is provided. The method may include setting an image format metadata type identifier, wherein the image format metadata type identifier indicates a type of metadata included in a supplemental enhancement information (SEI) message associated with a current image; signaling the image format metadata type identifier in a bitstream; and encoding the current image in the bitstream based on the image format metadata type identifier. The method may also include setting an image format metadata universal resource identifier flag, wherein the image format metadata universal resource identifier flag indicates whether image information payload associated with the current image is obtained from a payload of the SEI message; and signaling the image format metadata universal resource identifier flag in the bitstream.

According to an embodiment, an apparatus for video processing is provided. The apparatus may include at least one memory configured to store program code; and at least one processor configured to read the program code and operate as instructed by the program code. The program code may include receiving code configured to cause the at least one processor to receive a video bitstream comprising a coded image; first obtaining code configured to cause the at least one processor to obtain an image format metadata type identifier, wherein the image format metadata type identifier indicates a type of metadata included in a supplemental enhancement information (SEI) message associated with the coded image; decoding code configured to cause the at least one processor to decode the coded image based on the image format metadata type identifier. The program code may also include second obtaining code configured to cause the at least one processor to obtain an image format metadata universal resource identifier flag, wherein the image format metadata universal resource identifier flag indicates whether image information payload associated with the coded image is obtained from a payload of the SEI message.

According to an embodiment, a non-transitory computer-readable medium storing instructions is provided. The instructions may include: one or more instructions that, when executed by one or more processors of a device, cause the one or more processors to perform a conversion between a visual media file and a bitstream of the visual media file, wherein the bitstream may include an image format metadata type identifier, wherein the image format metadata type identifier indicates a type of metadata included in a supplemental enhancement information (SEI) message associated with a current image; and an image format metadata universal resource identifier flag, wherein the image format metadata universal resource identifier flag indicates whether image information payload associated with the current image is obtained from a payload of the SEI message.

BRIEF DESCRIPTION OF THE DRAWINGS

Further features, nature, and various advantages of the disclosed subject matter will be more apparent from the following detailed description and the accompanying drawings in which:

FIG. 4 is a schematic illustration of a simplified block diagram of a video encoder, in accordance with embodiments of the present disclosure.

FIG. 14 is an illustration of a syntax of a JFIF metadata SEI message, in accordance with embodiments of the present disclosure.

FIG. 15 is an illustration of a syntax of an XMP metadata SEI message, in accordance with embodiments of the present disclosure.

FIG. 16 is an illustration of a syntax of a plurality of metadata in a SEI message, in accordance with embodiments of the present disclosure.

FIG. 17 is an exemplary diagram of a computer system suitable for implementing embodiments.

DETAILED DESCRIPTION

The following detailed description of example embodiments refers to the accompanying drawings. The same reference numbers in different drawings may identify the same or similar elements.

Figure 1:
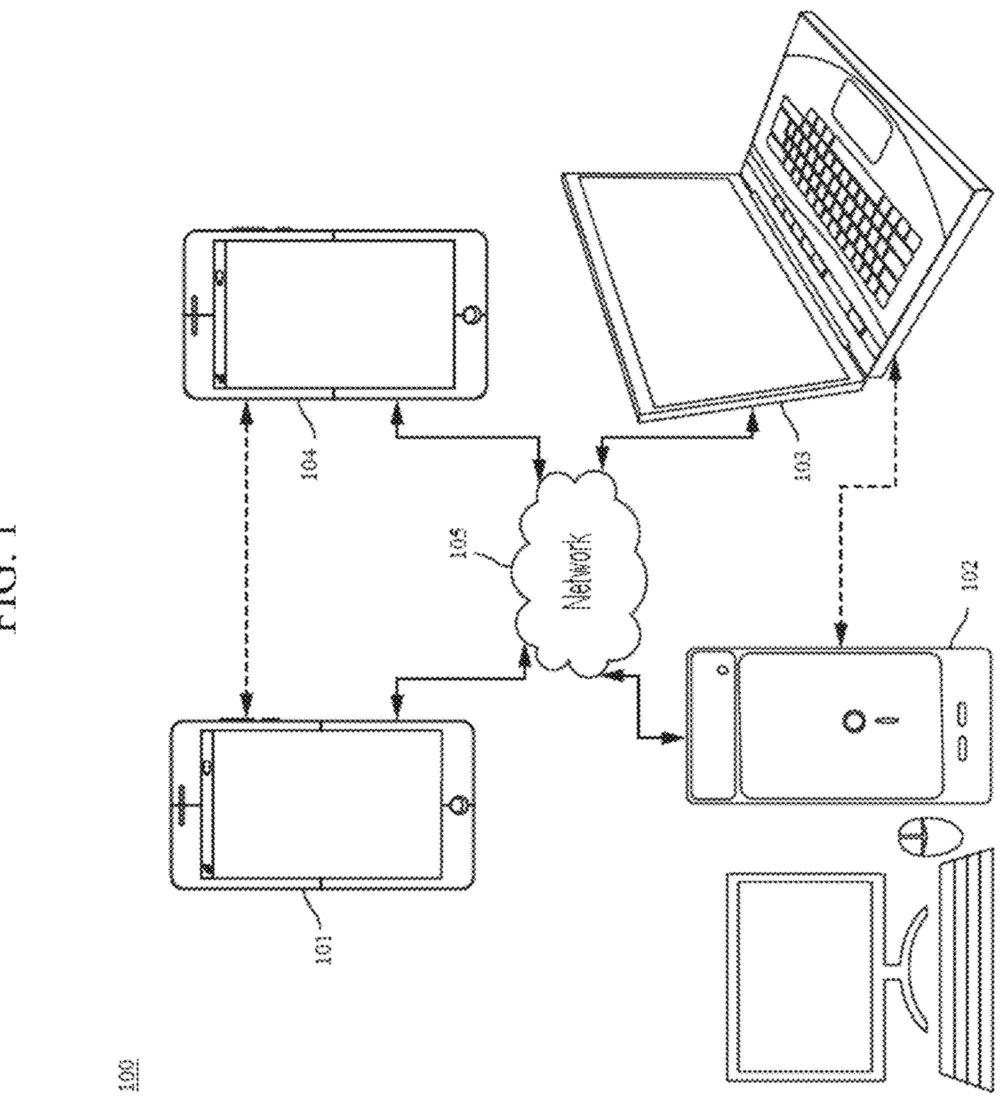
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
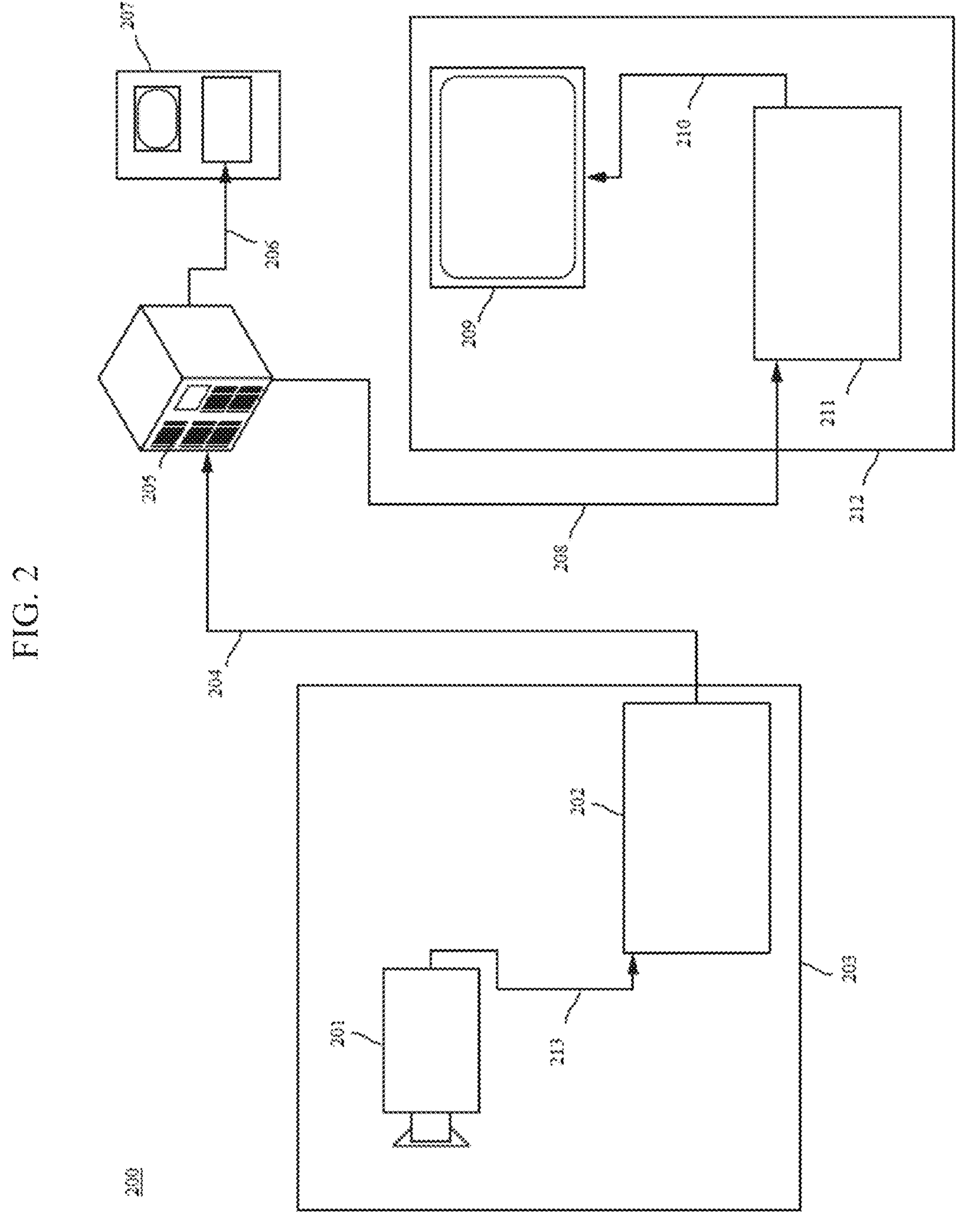
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device. In some streaming systems, the video bitstreams 204, 206 and 208 can be encoded according to certain video coding/compression standards. Examples of those standards are noted above and described further herein.

Figure 3:
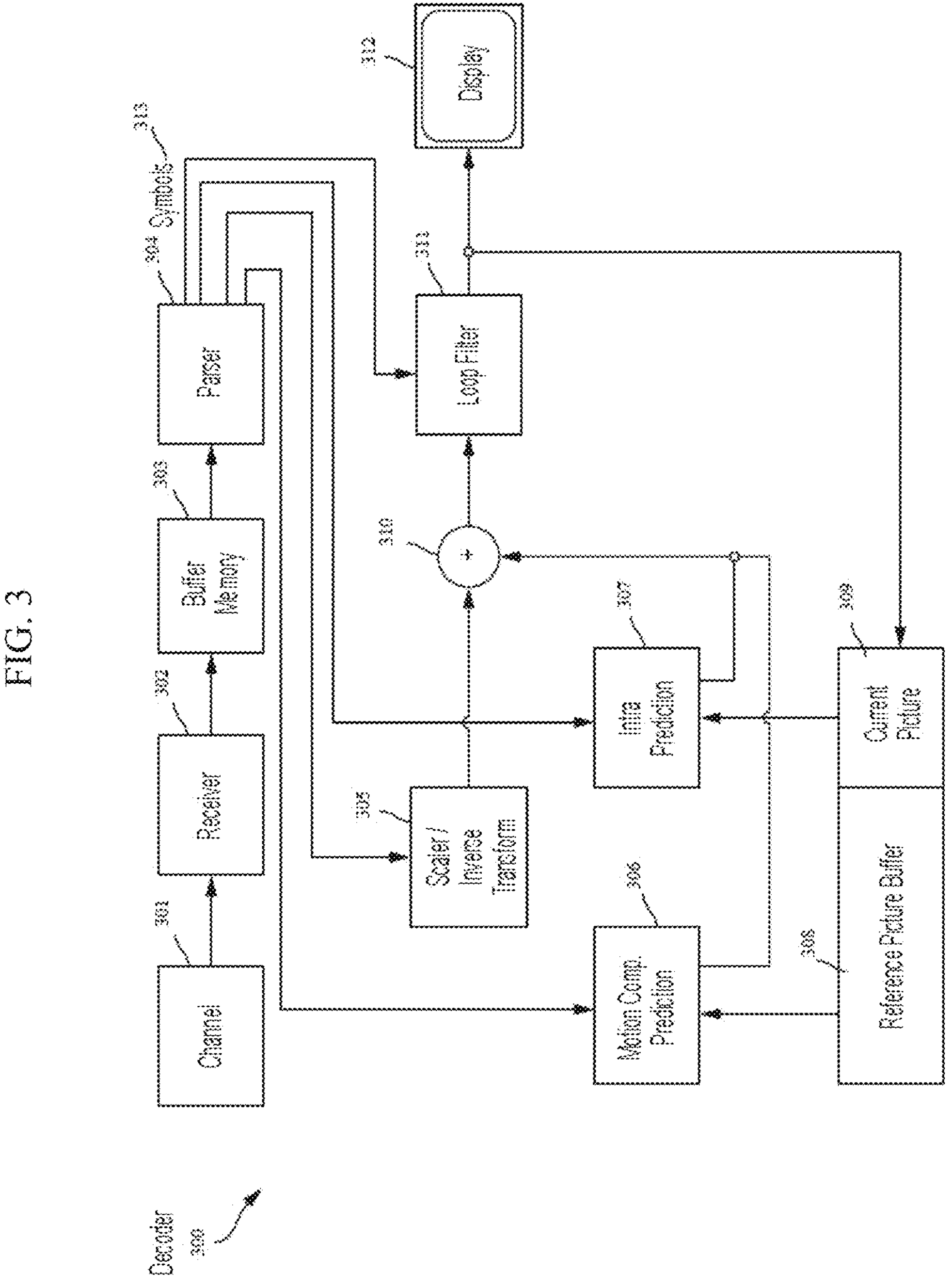
FIG. 3 is a schematic illustration of a simplified block diagram of a video decoder, in accordance with embodiments of the present disclosure.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities. The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments. The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder 303 in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder, the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams.

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Compressed video can be augmented, in the video bitstream, by supplementary enhancement information, for example in the form of Supplementary Enhancement Information (SEI) Messages or Video Usability Information (VUI). Video coding standards can include specifications parts for SEI and VUI. SEI and VUI information may also be specified in stand-alone specifications that may be referenced by the video coding specifications.

Figure 5:
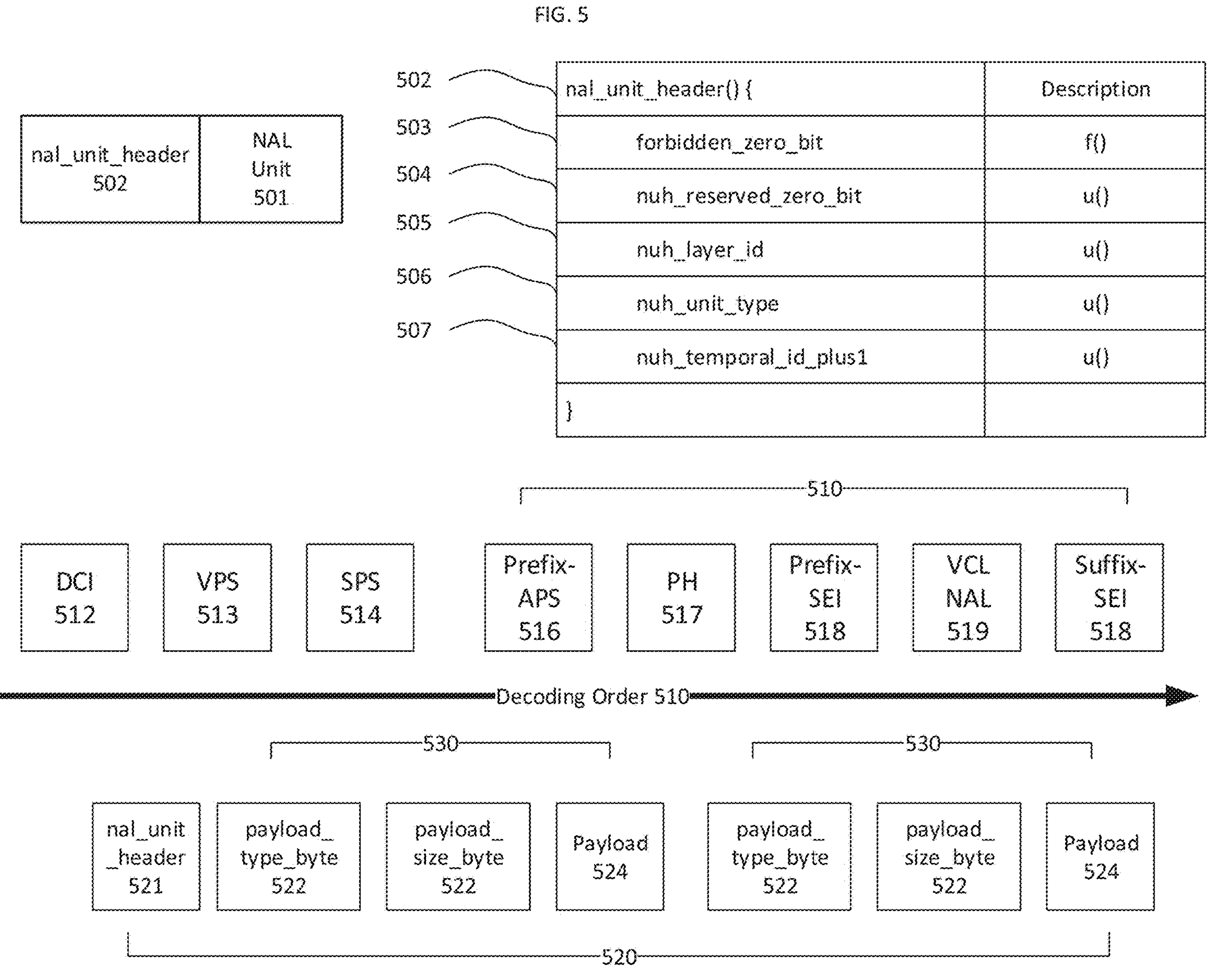
FIG. 5 is a schematic illustration of a NAL unit and SEI headers, in accordance with embodiments of the present disclosure.

FIG. 5 illustrates an exemplary layout of a Coded Video Sequence (CVS) in accordance with H.266. The coded video sequence is subdivided into Network Abstraction Layer units (NAL units). An exemplary NAL unit 501 can include a NAL unit header 502, which in turn comprises 16 bits as follows: a forbidden_zero_bit 503 and nuh_reserved_zero_bit 504 may be unused by H.266 and may be zero in a NAL unit. compliant with H.266. Three bits of nuh_layer_id 505 may be indicative of the (spatial, SNR, or multi-view enhancement) layer to which the NAL unit belongs. Five bits of nuh_nal_unit_type define the type of NAL unit. In H.266, 22 NAL unit type values are defined for NAL unit types defined in H.266, six NAL unit types are reserved, and four NAL unit type values are unspecified and can be used by specifications other than H.266. Finally, three bits of the NAL unit header indicate the temporal layer to which the NAL unit belongs nuh_temporal_id_plus1 506.

A coded picture may contain one or more Video Coding Layer (VCL) NAL units and zero or more non-VCL NAL units. VCL NAL units may contain coded data conceptually belonging to a video coding layer as introduced before. Non-VCL NAL units may contain data conceptually belonging data not conceptually belonging to the video coding layer, and can be characterized into:

(1) Parameter sets, which comprise information that can be necessary for the decoding process and can apply to more than one coded picture. Parameter sets and conceptually similar NAL units may be of NAL unit types such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and staying constant throughout a coded video sequence CVS), PPS_NUT (Picture Parameter Set (PPS), establishing, among other things, parameter used and staying constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH_NUT), which is also a "normative" NAL unit.

(3) NAL units marking certain places in a NAL unit stream. Those include NAL units with the NAL unit types AUD_NUT (Access Unit Delimiter), EOS_NUT (End of Sequence) and EOB_NUT (End of Bitstream). These are non-normative, also known as informative, in the sense that a compliant decoder does not require them for its decoding process, although it needs to be able to receive them in the NAL unit stream.

(4) Prefix and Suffix SEI Nal unit types (PREFIX_SEI_NUT and SUFFIX_SEI_NUT) which indicate NAL units containing Prefix and Suffix supplementary enhancement information. IN H.266, those NAL units are informative, as they are not required for the decoding process.

(5) Filler Data NAL unit type FD_NUT indicates filler data; data that can be random and can be used to "waste" bits in a NAL unit stream or bitstream, which may be necessary for the transport over certain isochronous transport environments.

(6) Reserved and Unspecified NAL unit types.

Referring to FIG. 5, a layout of a NAL unit stream in decoding order 510 containing a coded picture 511 containing NAL units of some of the types previously introduced. Somewhere early in the NAL unit stream, DCI 512, VPS 513, and SPS 514 may, in combination, establish the parameters which the decoder can use to decode the coded pictures of a coded video sequence (CVS), including coded picture 511 of the NAL unit stream.

The coded picture 511 can contain, in the depicted order or any other order compliant with the video coding technology or standard in use: a Prefix APS 516, Picture header 517, prefix SEI 518, one or more VCL NAL units 519, and suffix SEI 520.

Prefix and suffix SEI NAL units (e.g., 518 and 520) were motivated during the standards development as, for some SEI messages, the content of the message would be known before the coding of a given picture commences, whereas other content would only be known once the picture were coded. Allowing certain SEI messages to appear early or late in a coded picture's NAL unit stream through prefix and suffix SEIs allows avoiding buffering. As one example, in an encoder the sampling time of a picture to be coded is known before the picture is coded, and hence the picture timing SEI message can be a prefix SEI message 516.

On the other hand, a decoded picture hash SEI message, which contains a hash of the sample values of a decoded pictures and can be useful, for example, to debug encoder implementations, is a suffix SEI message 518 as an encoder cannot calculate a hash over reconstructed samples before a picture has been coded. The location of Prefix and Suffix SEI NAL units may not be restricted to their position in the NAL unit stream. The phrase "Prefix" and "Suffix" may imply to what coded pictures or NAL units the Prefix/Suffix SEI message may pertain to, and the details of this applicability may be specified, for example in the semantics description of a given SEI message.

Referring again to FIG. 5, a simplified syntax diagram of a NAL unit that contains a prefix or suffix SEI message 520. This syntax is a container format for multiple SEI messages that can be carried in one NAL unit. Details of the emulation prevention syntax specified in H.266 are omitted here for clarity. As other NAL units, SEI NAL units start with a NAL unit header 521. The header is followed by one or more SEI messages; two are depicted (e.g., 530, 531 and described henceforth. Each SEI message inside the SEI NAL unit includes an 8 bit payload_type_byte 522 which specifies one of 256 different SEI types; an 8 bit payload_size_byte 523 which specifies the number of bytes of the SEI payload, and payload_size-byte number of bytes Payload 524. This structure can be repeated until a payload_type_byte equal to 0xff is observed, which indicates the end of the NAL unit. The syntax of the Payload 524 depends on the SEI message, it can be of any length between 0 and 255 bytes.

Figure 6:
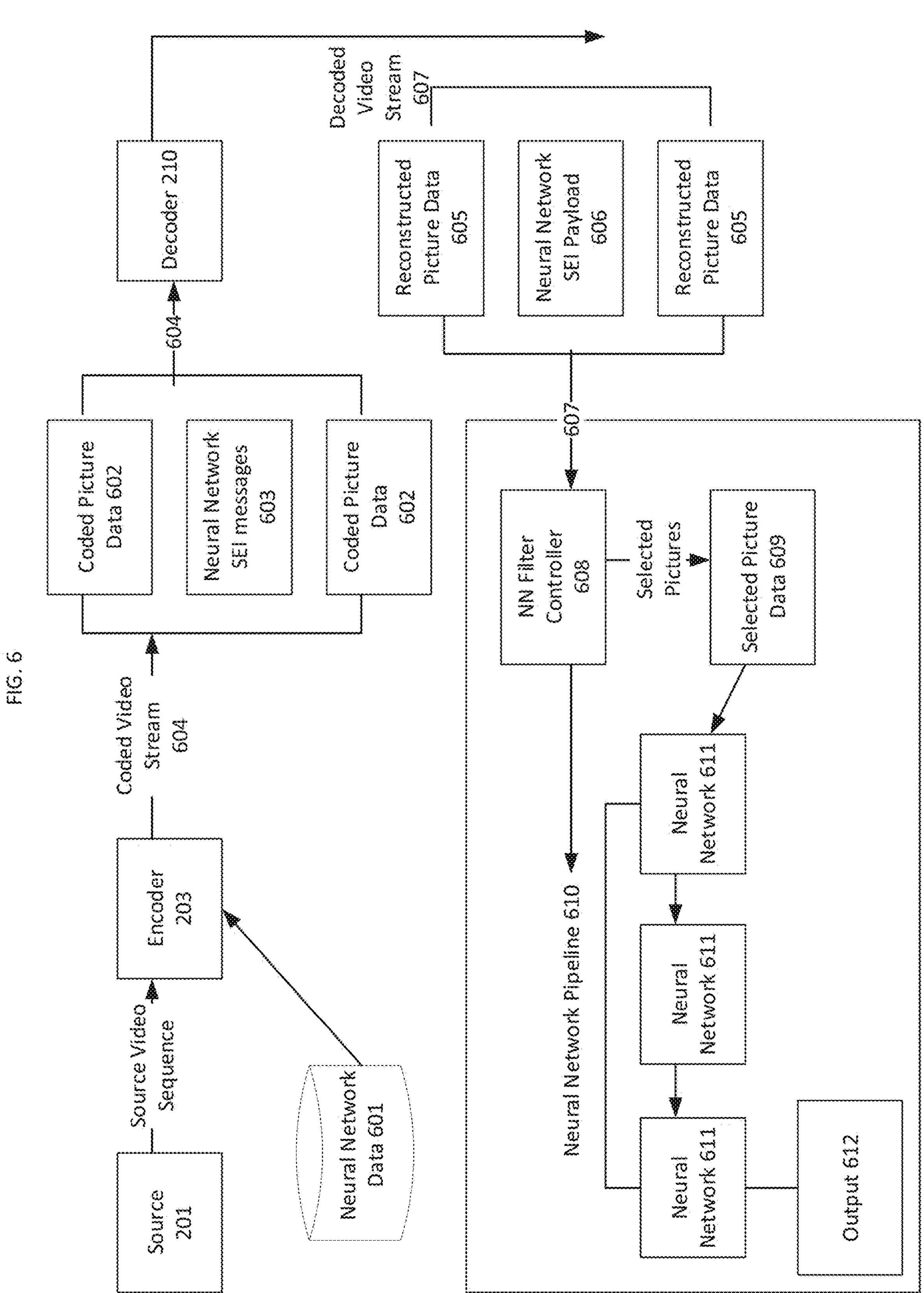
FIG. 6 is a schematic illustration of a simplified encoding and decoding system that employs a neural network post filtering process in which neural network models are carried or referenced from SEI messages, in accordance with embodiments of the present disclosure.

FIG. 6 may be a functional block diagram of an encoding and decoding system that employs a neural network post filtering process 613 in which the neural network models are either carried in the payload of the SEI message or referenced in the SEI message by a URI to a source external to the coded video stream. Such an example system can include a video source 201, for example a digital camera, creating a for example source video sequence that is input to an encoder 203. In addition to the source video sequence, the encoder 203 can receive input from a for example separate source 601 that contains one or more neural network models that can be used in a post filtering process 613. The output from the encoder 203 is a coded video stream 604 comprised of one or more sequences of coded picture data 602 and SEI messages 603 that may reference or carry neural network model information in the payload of the SEI messages 603. Coded video stream 604 is input into a decoder 210 that can output the decoded video stream 607 comprised of sequences of reconstructed picture data 605 and payloads 606 of the neural network SEI messages. Decoded video stream 604 can be input to a neural network post filtering process 613 in which a neural network filter controller 608 performs any series of steps that can include: (1) selecting picture data 609 from amongst the data in the decoded video stream 607 and (2) establishing a sequence of one or more neural network filters 611 that comprise a "pipeline" 610 of neural network filters according to the SEI payloads 606.

Output 612 from the neural network pipeline 610 may also be the output from the neural network post filtering process 613.

Figure 7:
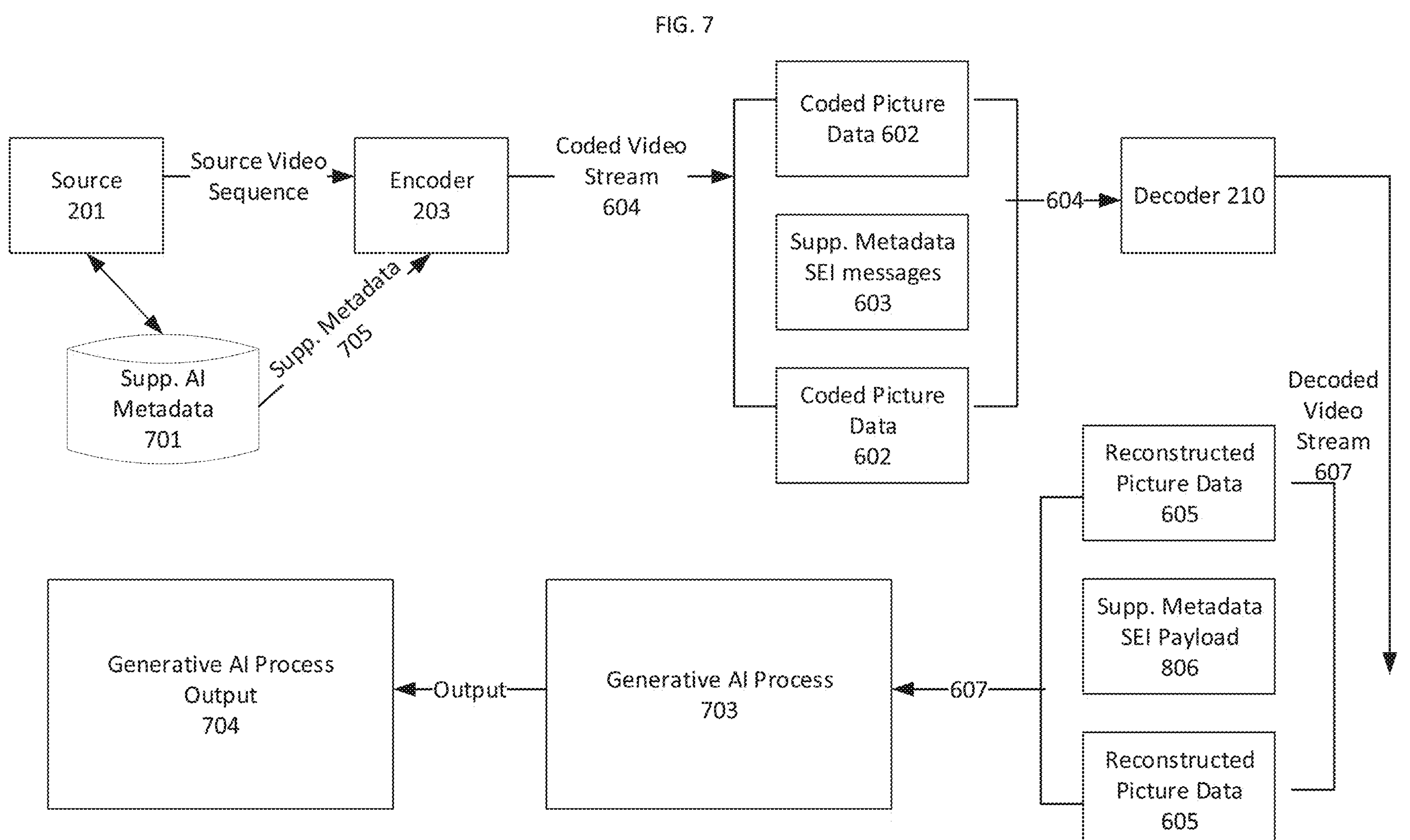
FIG. 7 is a schematic illustration of a scenario in which an AI image or video generator application leverages a video encoding and decoding process to create input to the AI image or video generator application, in accordance with embodiments of the present disclosure.

FIG. 7 is a functional block diagram of an encoding and decoding system that employs a generative AI post filtering process 703. Such an example system can include a video source 201, for example a digital camera, creating a for example source video sequence that is input to an encoder 203. Depicted in the figure is a separate source 801 of supplemental data 805 that may further describe video source 201. Encoder 203 can receive both the supplemental metadata and the source video sequence.

The output from the encoder 203 is a coded video stream 604 comprised of one or more sequences of coded picture data 602 and SEI messages 802 that may reference or carry the supplemental metadata in the payload of the SEI messages 802. Coded video stream 604 is input into a decoder 210 that can output the decoded video stream 607 comprised of sequences of reconstructed picture data 605 and payloads 806 of supplemental data SEI messages. Decoded video stream 607 can be input to a generative AI post filtering process 703. Output 704 can be from the generative AI post filtering process 703.

Embodiments of the present disclosure relate to SEI messages to enable the carriage of popular image metadata formats within coded video streams. The SEI messages and syntaxes disclosed herein may carry payloads from popular image metadata formats, i.e., Exchangeable Image File (EXIF) metadata, JPEG File Interchange Format (JFIF), and Extensible Metadata Platform (XMP), etc. The metadata may be carried in the payload of the SEI message, or as an alternative, the SEI message may be created with a Uniform Resource Identifier (URI) that identifies the exact metadata resource to be obtained from a source external to the video bitstream.

Figure 8:
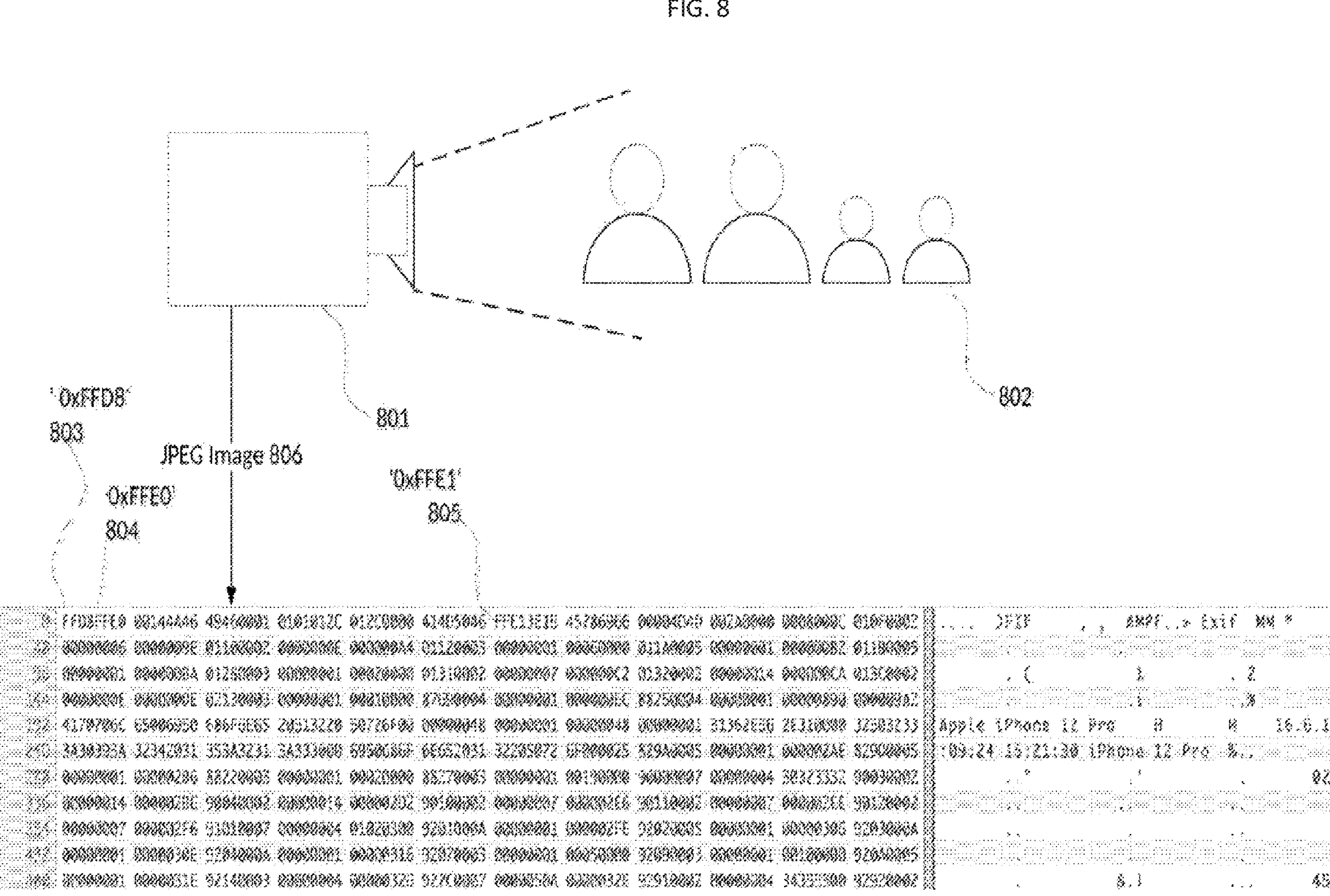
FIG. 8 is a schematic illustration of a system for embedding image metadata within an image, in accordance with embodiments of the present disclosure.

FIG. 8 is an illustration of a capture system that embeds JFIF and EXIF metadata within a JPEG image. The use of a JPEG image is exemplary and not intended as a limitation to the present disclosure. In FIG. 8, digital camera 801 captures a scene 802 and can emit JPEG image 806. A portion of JPEG image 805 can be represented by the sequence of hexadecimal numbers (and corresponding ASCII interpretation) shown in the figure in which '0xFFD8' represents the "Start of Image" JPEG marker 803 as specified in the JPEG image coding standard.

As shown in FIG. 8, APP0 marker segment 804 which is defined by the sequence '0xFFE0' in the JPEG standard marks the beginning the JFIF metadata. The JFIF metadata may be specified by an ITU-T Recommendation. As further shown in FIG. 8, APP1 marker segment 805 which is defined by the sequence '0xFFE1' in the JPEG standard marks the beginning the EXIF metadata. The EXIF metadata is specified by any of the existing EXIF specifications. While examples of JFIF and EXIF metadata are used, the disclosures are not limited herein.

Figure 9:
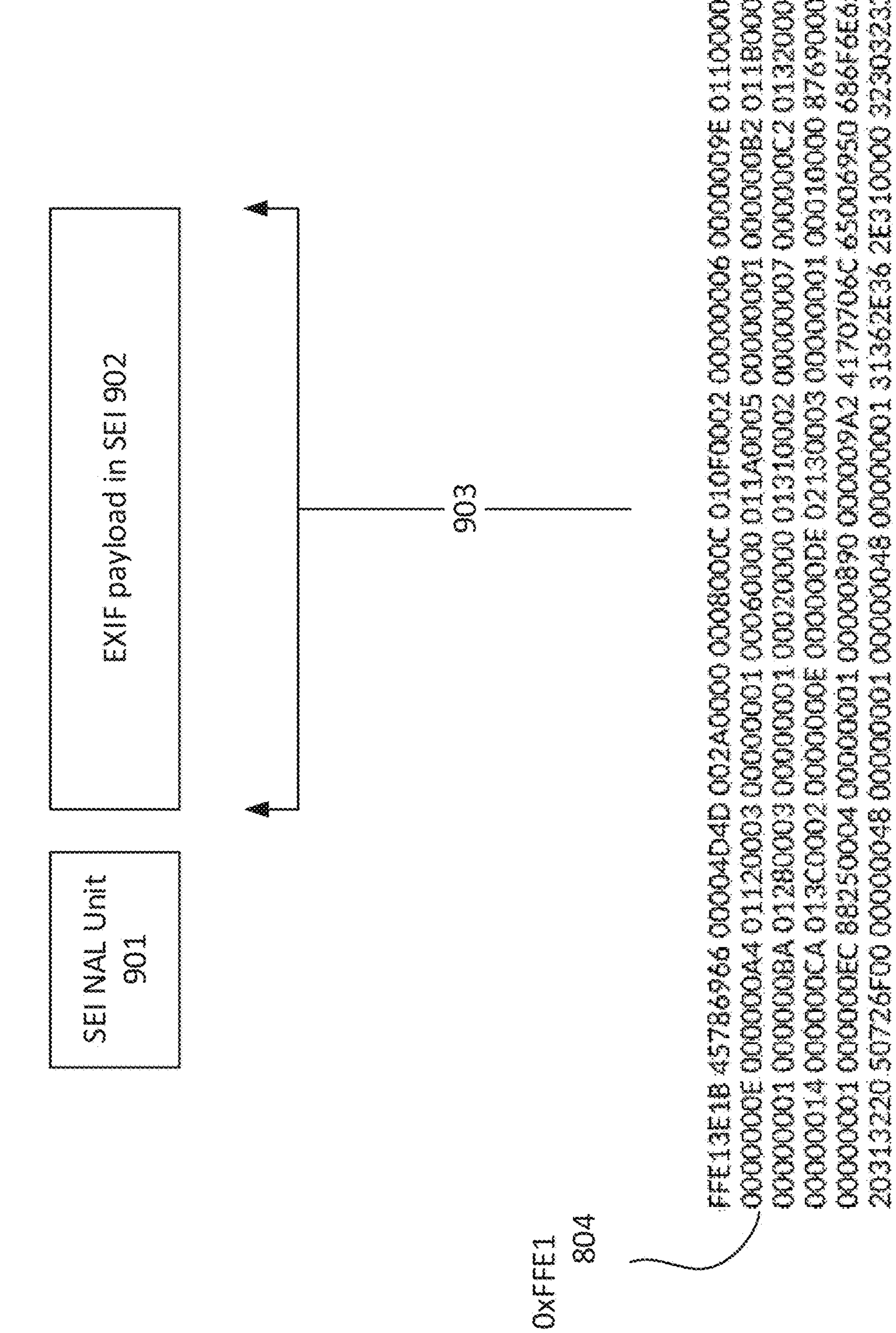
FIG. 9 is a schematic illustration of the carriage of image metadata within the payload of an SEI message, in accordance with embodiments of the present disclosure.

FIG. 9 is an illustration of the carriage of image metadata in an SEI message. As shown in FIG. 9, a portion of EXIF metadata 903 beginning with APP1 marker 805 serves as an example of image metadata that can be packaged into an SEI message 902 that can be specified by a video standard for the purpose of carrying the EXIF metadata payload in a coded video stream created by an encoder and decoded by a decoder. As per the specifications of video standards, the presence of SEI message 902 may be signaled by an SEI NAL unit 901.

Figure 10:
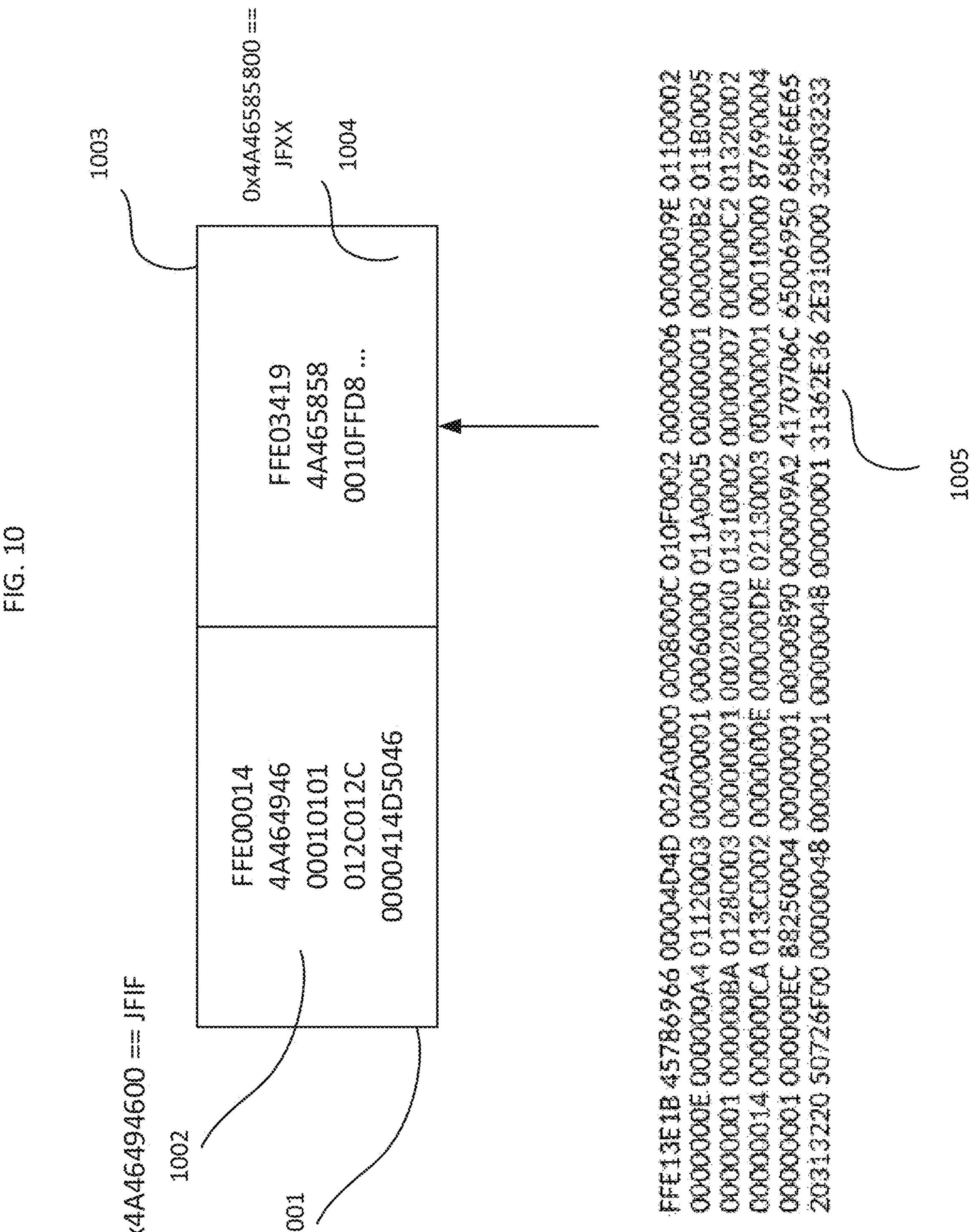
FIG. 10 is a schematic illustration of the carriage of JFIF metadata that includes a JFIF extension marker segment within an image, in accordance with embodiments of the present disclosure.

FIG. 10 is an illustration of JFIF metadata in which the metadata includes a JFIF extension according to its ITU-T Recommendation. As shown in FIG. 9, the beginning portion 1001 of the JFIF metadata can be identified by the hexadecimal values of 0x4A46494600' stored in an APP0 marker segment of '0xFFE0' in which the ASCII representation of '0x4A46494600' 1002 is "JFIF". Proceeding the beginning portion 1001 is a JFIF extension 1003 which can be identified by the hexadecimal values of '0x4A46585800' that can be stored in a subsequent APP0 marker segment of '0xFFE0'. The ASCII representation 904 of '0x4A46585800' is "JFXX". In an embodiment, extension 1003 may carry a "thumbnail" representation 1005 of the original image 805. The thumbnail may also be compressed using the coding scheme specified in ITU-T Recommendation T.81 and hence is signaled by the '0xFFD8' Start of Image marker segment.

Figure 11:
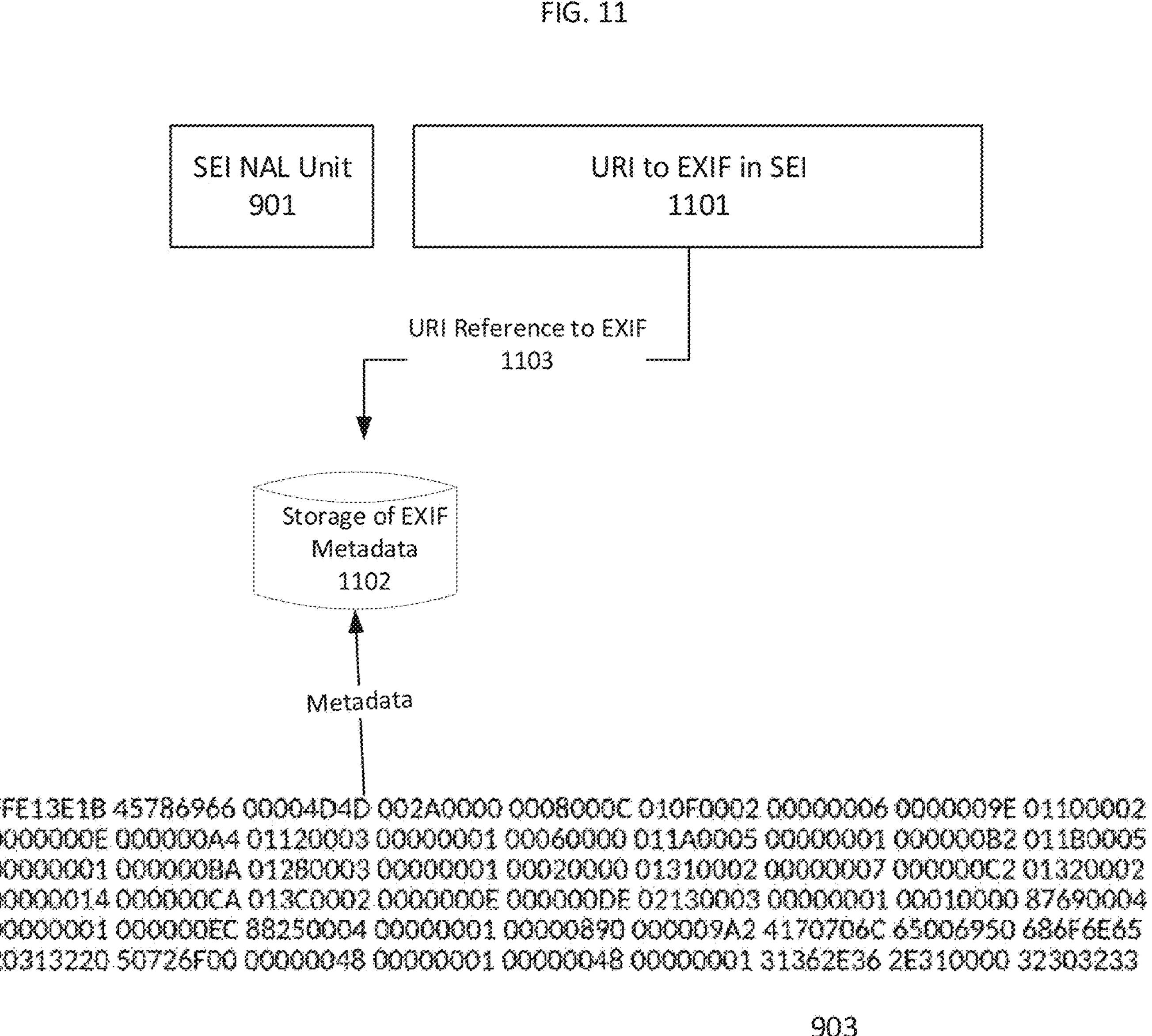
FIG. 11 is a schematic illustration of the reference of EXIF metadata within the payload of an SEI message, in accordance with embodiments of the present disclosure.

FIG. 11 is an illustration of an embodiment of an SEI message 1101 for the carriage of EXIF metadata 903 in which the portion of EXIF metadata 903 can be referenced by a URI 1103 from within the payload of SEI message 1101. In this embodiment, the portion of the EXIF metadata may reside at or in a location 1102 separate from SEI message 1101.

Figure 12:
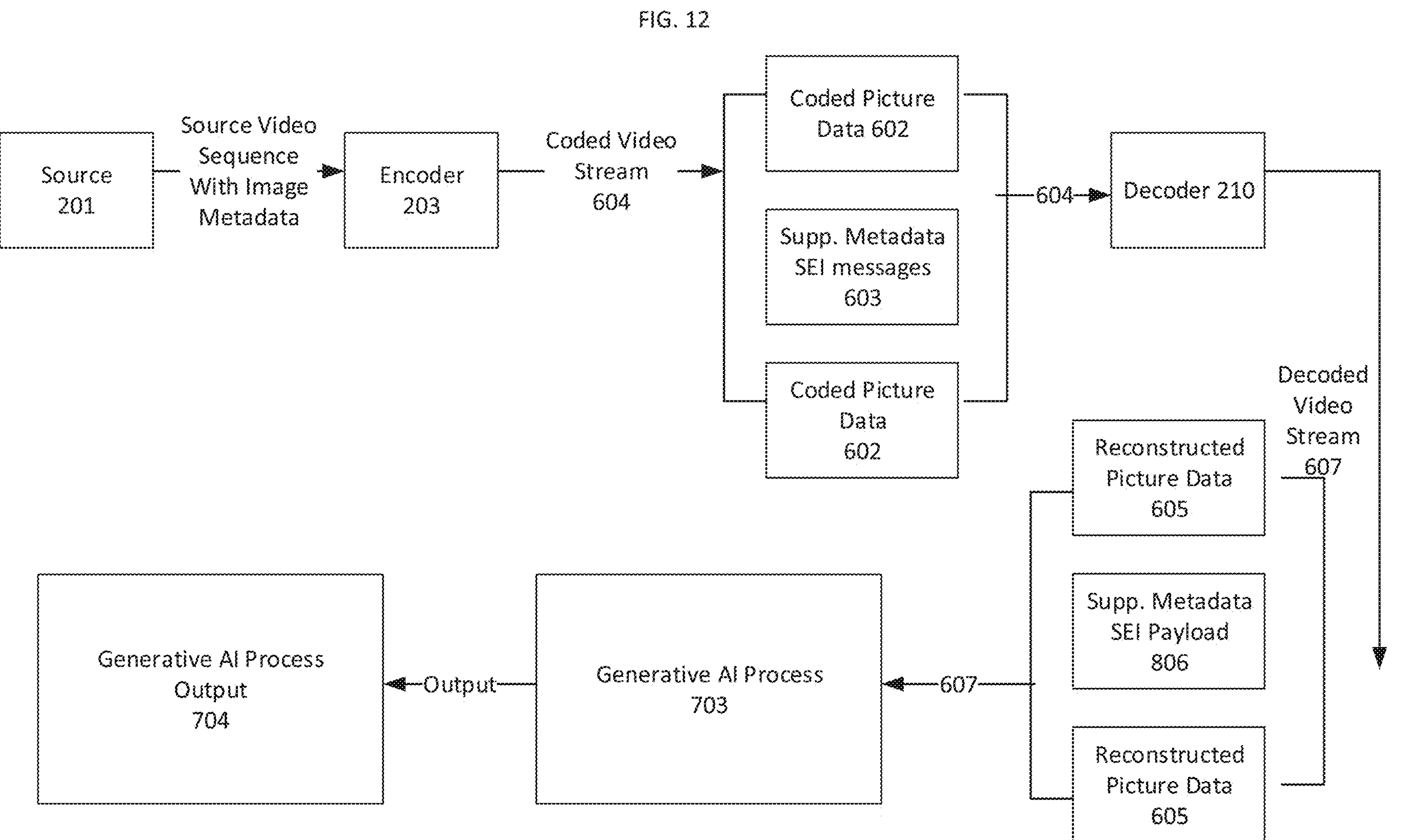
FIG. 12 is a schematic illustration of the ingest of an image metadata SEI message by a generative AI post filtering process, in accordance with embodiments of the present disclosure.

FIG. 12 is an illustration of a system that can use image metadata embedded within a video sequence 1201 created by a source 201 in a generative AI post filtering process 703. Sequence 1201 can be input to encoder 203. Output from encoder 203 can be a coded video stream 604 comprised of for example coded video data 602 and image metadata SEI messages 902. Coded video stream 604 can be reconstructed by a decoder 210 that can output decoded video stream 607. Stream 607 can be comprised of reconstructed picture data 605 and image metadata payloads 1102. Stream 607 can be input to a generative AI process 703 that can then create generative AI process output 704.

Figure 13:
FIG. 13 is an illustration of a syntax of an EXIF metadata SEI message, in accordance with embodiments of the present disclosure.

FIG. 13 is an exemplary syntax for an EXIF SEI message. Cancel flag 1301 can be used to disable the persistence of a previously processed EXIF SEI message. If flag 1301 is set to a value indicating 'true' then processing of the current EXIF SEI message can complete. If flag 1301 is set to a value indicating 'false' then EXIF persistence flag 1302 signals the range by which the current EXIF SEI message persists. It can be a common practice in the specification of SEI messages that such messages define both a "cancel" and "persistence" flag, as illustrated in flags 1301 and 1302 respectively, in which case the semantics of such flags can be consistently applied throughout the VSEI standard.

EXIF mode ID 1303 can indicate whether the payload of the SEI message is the EXIF metadata itself or a URI for the location of the EXIF metadata. As an example, if mode ID 1303 is equal to ZERO, then EXIF data payload byte 1304 receives a byte of data from the SEI payload. If mode ID 1203 is equal to ONE, then EXIF data URI 1305 receives a string of data from the SEI payload. A person of skill in the art will understand that while EXIF metadata is used as an example, the exemplary syntax disclosed in FIG. 13 may be used for other image formats and metadata types.

FIG. 14 is an embodiment of a syntax for a JFIF SEI message. Cancel flag 1401 can be used to disable the persistence of a previously processed JFIF SEI message, and JFIF type ID 1402 can signal the type of JFIF payload that is carried in the remainder of the SEI payload. As an example, if flag 1401 is set to a value indicating 'true' then processing of the current JFIF SEI message can complete. If flag 1401 is set to a value indicating 'false' then JFIF persistence flag 1403 signals the range by which the current JFIF SEI message persists. As above, it may be a common practice in the specification of SEI messages that such messages define both a "cancel" and "persistence" flag, as illustrated in flags 1401 and 1403 respectively, in which case the semantics of such flags may be consistently applied throughout the VSEI standard.

As shown in FIG. 14, if type ID 1402 is equal to a value of ZERO, then the type of JFIF payload can be comprised of bytes from both types of JFIF marker segments including: (1) a beginning portion (as illustrated in FIG. 10 as 1001) of JFIF data signaled with the string "JFIF" 1002 and (2) a subsequent portion (as illustrated in FIG. 10 as 1003) of JFIF data signaled with the string "JFXX" 1004. In this embodiment, a JFIF data payload byte 1404 receives a byte of data from the SEI payload. If type ID 1402 is equal to a value of ONE, then the type of JFIF payload can be comprised of bytes from JFIF marker segments (as illustrated in FIG. 10 as 1003) f JFIF data signaled with the string "JFXX" 1004—in which case a JFIF extension payload byte 1405 receives a byte of data from the SEI payload. If type ID 1402 is equal to a value of TWO, then the type of JFIF payload can be comprised of bytes from JFIF marker segments (as illustrated in FIG. 10 as 1001) of JFIF data signaled with the string "JFIF" 1002—in which case a JFIF header payload byte 1406 receives a byte of data from the SEI payload. A person of skill in the art will understand that while JFIF metadata is used as an example, the exemplary syntax disclosed in FIG. 14 may be used for other image formats and metadata types.

FIG. 15 is an embodiment of a syntax for an XMP SEI message. Cancel flag 1501 can be used to disable the persistence of a previously processed XMP SEI message. As an example, if flag 1501 is set to a value indicating 'true' then processing of the current XMP SEI message can complete. If flag 1501 is set to a value indicating 'false' then XMP persistence flag 1502 signals the range by which the current XMP SEI message persists. It can be a common practice in the specification of SEI messages that such messages define both a "cancel" and "persistence" flag, as illustrated in flags 1501 and 1502 respectively, in which case the semantics of such flags can be consistently applied throughout the VSEI standard. If flag 1501 is set to a value indicating 'false' then XMP data payload byte 1503 receives a byte of data from the SEI payload. A person of skill in the art will understand that while XMP metadata is used as an example, the exemplary syntax disclosed in FIG. 15 may be used for other image formats and metadata types.

FIG. is an embodiment of a syntax for a single image metadata SEI message that may carry the payload of either EXIF, JFIF, or XMP. Cancel flag 1601 can be used to disable the persistence of a previously processed message with the same image metadata type 1602. IM type 1602 can signal the type of metadata payload that is carried in the remainder of the SEI payload. If flag 1601 is set to a value indicating "true" then processing of the current image metadata SEI can complete. If flag 1601 is set to "false" the image persistence flag 1603 signals the range by which the current image metadata SEI message persists. It can be a common practice in the specification of SEI messages that such messages define both a "cancel" and "persistence" flag, as illustrated in flags 1601 and 1603 respectively, in which case the semantics of such flags can be consistently applied throughout the VSEI standard.

If IM type 1602 is equal to a value of ZERO, then the type of image metadata that is carried in the remainder of the payload for the EXIF metadata format. In such an embodiment, EXIF mode ID 1303 can indicate whether the payload of the SEI message is the EXIF metadata itself to a URI for the location of the EXIF metadata. if mode ID 1303 is equal to ZERO, the EXIF data payload type 1304 receives a byte of data from the SEI payload. If mode ID 1303 is equal to ONE, then EXIF data URI 1305 receives a string of data from the SEI payload.

Further, as shown in FIG. 16, if IM type 1602 is equal to a value of ONE, then the type of metadata that is accrued in the remainder of the payload may be for the JFIF metadata format. if JFIF type ID 1402 is equal to a value of ZERO, then the type of JFIF payload can be comprised of bytes from both types of JFIF marker segments including: (1) a beginning portion (as illustrated in FIG. 10 as 1001) of JFIF data signaled with the string "JFIF" 1002 and (2) a subsequent portion (as illustrated in FIG. 10 as 1003) of JFIF data signaled with the string "JFXX" 1004. In this embodiment, a JFIF data payload byte 1404 receives a byte of data from the SEI payload. If JFIF type ID 1402 is equal to a value of ONE, then the type of JFIF payload can be comprised of bytes from JFIF marker segments (as illustrated in FIG. 10 as 1003) of JFIF data signaled with the string "JFXX" 1004—in which case a JFIF extension payload byte 1405 receives a byte of data from the SEI payload. If JFIF type ID 1402 is equal to a value of TWO, then the type of JFIF payload can be comprised of bytes from JFIF marker segments (as illustrated in FIG. 10 as 1001) of JFIF data signaled with the string "JFIF" 1002—in which case a JFIF header payload byte 1406 receives a byte of data from the SEI payload.

Further, as shown in FIG. 16, if IM type 1602 has a value equal to TWO, then the type of image metadata that is carried in the remainder of the payload can be for the XMP metadata format. The XMP data payload byte 1503 receives a byte of data from the SEI payload.

The techniques described above, can be implemented as computer software using computer-readable instructions and physically stored in one or more computer-readable media or by a specifically configured one or more hardware processors. For example, FIG. 17 shows a computer system 1700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 17 for computer system 1700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1700.

Computer system 1700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1701, mouse 1702, trackpad 1703, touch screen 1710, joystick 1705, microphone 1706, scanner 1708, camera 1707.

Computer system 1700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1710, or joystick 1705, but there can also be tactile feedback devices that do not serve as input devices), audio output devices (such as: speakers 1709, headphones (not depicted)), visual output devices (such as screens 1710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1700 can also include human accessible storage devices and their associated media such as optical media including CD/DVD ROM/RW 1720 with CD/DVD 1711 or the like media, thumb-drive 1722, removable hard drive or solid state drive 1723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1700 can also include interface 1799 to one or more communication networks 1798. Networks 1798 can for example be wireless, wireline, optical. Networks 1798 can further be local, wide-area, metropolitan, vehicular and industrial, real-time, delay-tolerant, and so on. Examples of networks 1798 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1798 commonly require external network interface adapters that attached to certain general-purpose data ports or peripheral buses (1750 and 1751) (such as, for example USB ports of the computer system 1700; others are commonly integrated into the core of the computer system 1700 by attachment to a system bus as described below (for example Ethernet interface into a PC computer system or cellular network interface into a smartphone computer system). Using any of these networks 1798, computer system 1700 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1740 of the computer system 1700.

The core 1740 can include one or more Central Processing Units (CPU) 1741, Graphics Processing Units (GPU) 1742, a graphics adapter 1717, specialized programmable processing units in the form of Field Programmable Gate Areas (FPGA) 1743, hardware accelerators for certain tasks 1744, and so forth. These devices, along with Read-only memory (ROM) 1745, Random-access memory 1746, internal mass storage such as internal non-user accessible hard drives, SSDs, and the like 1747, may be connected through a system bus 1748. In some computer systems, the system bus 1748 can be accessible in the form of one or more physical plugs to enable extensions by additional CPUs, GPU, and the like. The peripheral devices can be attached either directly to the core's system bus 1748, or through a peripheral bus 1749. Architectures for a peripheral bus include PCI, USB, and the like.

CPUs 1741, GPUs 1742, FPGAs 1743, and accelerators 1744 can execute certain instructions that, in combination, can make up the aforementioned computer code. That computer code can be stored in ROM 1745 or RAM 1746. Transitional data can be also be stored in RAM 1746, whereas permanent data can be stored for example, in the internal mass storage 1747. Fast storage and retrieval to any of the memory devices can be enabled through the use of cache memory, that can be closely associated with one or more CPU 1741, GPU 1742, mass storage 1747, ROM 1745, RAM 1746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1700, and specifically the core 1740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1740 that are of non-transitory nature, such as core-internal mass storage 1747 or ROM 1745. The software implementing various embodiments of the present disclosure can be stored in such devices and executed by core 1740.

A computer-readable medium can include one or more memory devices or chips, according to particular needs. The software can cause the core 1740 and specifically the processors therein (including CPU, GPU, FPGA, and the like) to execute particular processes or particular parts of particular processes described herein, including defining data structures stored in RAM 1746 and modifying such data structures according to the processes defined by the software. In addition or as an alternative, the computer system can provide functionality as a result of logic hardwired or otherwise embodied in a circuit (for example: accelerator 1744, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of video encoding and/or decoding, the method including setting an image format metadata type identifier, wherein the image format metadata type identifier indicates a type of metadata included in a supplemental enhancement information (SEI) message associated with a current image; signaling the image format metadata type identifier in a bitstream; and encoding the current image in the bitstream based on the image format metadata type identifier.

(2) The method of feature (1), in which the type of metadata included in the SEI message comprises one of: Exchangeable Image File (EXIF) metadata; JPEG File Interchange Format (JFIF) metadata from one or more concatenated JFIF segments; JFIF metadata from one or more JFIF extension markers; JFIF metadata from one or more JFIF headers; and Extensible metadata platform (XMP) metadata.

(3) The method of any of the features of (1) to (2), in which the method further comprises setting an image format metadata universal resource identifier flag, wherein the image format metadata universal resource identifier flag indicates whether image information payload associated with the current image is obtained from a payload of the SEI message; and signaling the image format metadata universal resource identifier flag in the bitstream.

(4) The method of any of the features of (1) to (3), in which a first value of the image format metadata universal resource identifier flag indicates that the image information payload associated with the current image is obtained from the payload of the SEI message, and a second value of the image format metadata universal resource identifier flag indicates that the image information payload associated with the current image is obtained from a universal resource identifier.

(5) The method of any of the features of (1) to (4), in which when the image format metadata universal resource identifier flag has the second value, the method further comprises signaling a universal resource identifier (URI) string (6) The method of any of the features of (1) to (5), in which the method further comprises setting an image format metadata cancel flag, wherein the image format metadata cancel flag indicates that the SEI message associated with the current image cancels a persistence of any previous SEI message.

(7) The method of any of the features of (1) to (6), in which the method further comprises signaling a payload size that indicates a size of a payload of the SEI message.

(8) The method of any of the features of (1) to (7), in which the method further comprises receiving a video bitstream comprising a coded image; obtaining an image format metadata type identifier, wherein the image format metadata type identifier indicates a type of metadata included in a supplemental enhancement information (SEI) message associated with the coded image; and decoding the coded image based on the image format metadata type identifier.

(9) The method of any of the features of (1) to (8), in which the method further comprises obtaining an image format metadata universal resource identifier flag, wherein the image format metadata universal resource identifier flag indicates whether image information payload associated with the coded image is obtained from a payload of the SEI message.

(10) The method of any of the features of (1) to (9), in which when the image format metadata universal resource identifier flag has the second value, the method further comprises obtaining a universal resource identifier (URI) string.

(11) The method of any of the features of (1) to (10), in which the method further comprises obtaining an image format metadata cancel flag, in which the image format metadata cancel flag indicates that the SEI message associated with the current image cancels a persistence of any previous SEI message.

(12) The method of any of the features of (1) to (11), in which the method comprises performing a conversion between a visual media file and a bitstream of the visual media file according to a format rule, in which the bitstream includes an image format metadata type identifier, wherein the image format metadata type identifier indicates a type of metadata included in a supplemental enhancement information (SEI) message associated with a current image; and an image format metadata universal resource identifier flag, wherein the image format metadata universal resource identifier flag indicates whether image information payload associated with the current image is obtained from a payload of the SEI message.

(13) The method of any of the features of (1) to (12), in which when the image format metadata universal resource identifier flag has the second value, the bitstream further comprises signaling a universal resource identifier (URI) string.

(14) The method of any of the features of (1) to (13), in which the bitstream further comprises an image format metadata cancel flag, wherein the image format metadata cancel flag indicates that the SEI message associated with the current image cancels a persistence of any previous SEI message.

(15) An apparatus for video decoding, including processing circuitry that is configured to perform the method of any of features (1) to (14).

(16) An apparatus for video encoding, including processing circuitry that is configured to perform the method of any of features (1) to (14).

(17) A non-transitory computer-readable storage medium storing instructions which when executed by at least one processor cause the at least one processor to perform the method of any of features (1) to (14).

What is claimed is:

1. A method of video processing, the method being executed by at least one processor, and the method comprising:

setting an image format metadata type identifier, wherein the image format metadata type identifier indicates a type of metadata included in a supplemental enhancement information (SEI) message associated with a current image;

setting, in the SEI message, an image uri present flag, the image uri present flag indicating whether image information payload associated with the current image is to be obtained via one of a universal resource identifier and from the SEI message;

signaling the image format metadata type identifier in a bitstream and the image uri present flag; and encoding the current image in the bitstream based on the image format metadata type identifier and the image uri present flag.

2. The method of claim 1, wherein the type of metadata included in the SEI message comprises one of:

Exchangeable Image File (EXIF) metadata;

JPEG File Interchange Format (JFIF) metadata from one or more concatenated JFIF segments;

JFIF metadata from one or more JFIF extension markers;

JFIF metadata from one or more JFIF headers; and

Extensible metadata platform (XMP) metadata.

3. The method of claim 1, wherein a first value of the image uri present flag indicates that the image information payload associated with the current image is obtained from the payload of the SEI message, and wherein a second value of the image uri present flag indicates that the image information payload associated with the current image is obtained from a universal resource identifier.

4. The method of claim 3, wherein, when the image uri present flag has the second value, the method further comprises signaling a universal resource identifier (URI) string.

5. The method of claim 1, wherein the method further comprises:

setting an image format metadata cancel flag, wherein the image format metadata cancel flag indicates that the SEI message associated with the current image cancels a persistence of any previous SEI message.

6. The method of claim 1, wherein the method further comprises signaling a payload size that indicates a size of a payload of the SEI message.

7. An apparatus for video processing, the apparatus comprising at least one memory storing instructions; and at least one processor configured to execute the instructions and operate as instructed by the instructions, wherein the instructions program code comprise:

receiving code configured to cause the at least one processor to receive a video bitstream comprising a coded image;

first obtaining code configured to cause the at least one processor to obtain an image format metadata type identifier, wherein the image format metadata type identifier indicates a type of metadata included in a supplemental enhancement information (SEI) message associated with the coded image;

second obtaining code configured to cause the at least one processor to obtain an image uri present flag, the image uri present flag indicating whether image information payload associated with the current image is to be obtained via one of a universal resource identifier and from the SEI message; and decoding code configured to cause the at least one processor to decode the coded image based on the image format metadata type identifier and the image uri present flag.

8. The apparatus of claim 7, the type of metadata included in the SEI message comprises one of:

Exchangeable Image File (EXIF) metadata;

JPEG File Interchange Format (JFIF) metadata from one or more concatenated JFIF segments;

JFIF metadata from one or more JFIF extension markers;

JFIF metadata from one or more JFIF headers; and

Extensible metadata platform (XMP) metadata.

9. The apparatus of claim 7, wherein a first value of the image uri present flag indicates that the image information payload associated with the coded image is obtained from the payload of the SEI message, and wherein a second value of the image uri present flag indicates that the image information payload associated with the coded image is obtained from a universal resource identifier.

10. The apparatus of claim 9, wherein, when the image uri present flag has the second value, the program code further comprises third obtaining code configured to cause the at least one processor to obtain a universal resource identifier (URI) string.

11. The apparatus of claim 7, wherein the instructions further comprise fourth obtaining code configured to cause the at least one processor to obtain an image format metadata cancel flag, wherein the image format metadata cancel flag indicates that the SEI message associated with the current image cancels a persistence of any previous SEI message.

12. The apparatus of claim 7, wherein the instructions further comprise fifth obtaining code configured to cause the at least one processor to obtain a payload size that indicates a size of a payload of the SEI message.

13. A non-transitory computer readable medium for video processing, storing one or more instructions configured to cause at least one processor to:

perform a conversion between a visual media file and a bitstream of the visual media file according to a format rule, wherein the bitstream comprises:

an image format metadata type identifier, wherein the image format metadata type identifier indicates a type of metadata included in a supplemental enhancement information (SEI) message associated with a current image; and an instructions further comprise, wherein the image uri present flag indicates whether image information payload associated with the current image is to be obtained via one of a universal resource identifier and from the SEI message.

14. The non-transitory computer readable medium of claim 13, wherein the type of metadata included in the SEI message comprises one of:

Exchangeable Image File (EXIF) metadata;

JPEG File Interchange Format (JFIF) metadata from one or more concatenated JFIF segments;

JFIF metadata from one or more JFIF extension markers;

JFIF metadata from one or more JFIF headers; and

Extensible metadata platform (XMP) metadata.

15. The non-transitory computer readable medium of claim 13, wherein a first value of the image uri present flag indicates that the image information payload associated with the current image is obtained from the payload of the SEI message, and wherein a second value of the image uri present flag indicates that the image information payload associated with the current image is obtained from a universal resource identifier.

16. The non-transitory computer readable medium of claim 15, wherein, when the image uri present flag has the second value, the bitstream further comprises signaling a universal resource identifier (URI) string.

17. The non-transitory computer readable medium of claim 13, wherein the bitstream further comprises an image format metadata cancel flag, wherein the image format metadata cancel flag indicates that the SEI message associated with the current image cancels a persistence of any previous SEI message.

18. The non-transitory computer readable medium of claim 13, wherein the bitstream further comprises a payload size that indicates a size of the payload of the SEI message.

* * * * *